George H. Ramsey
Fredric H. Deily    Inventors

By W. N. Wright    Attorney

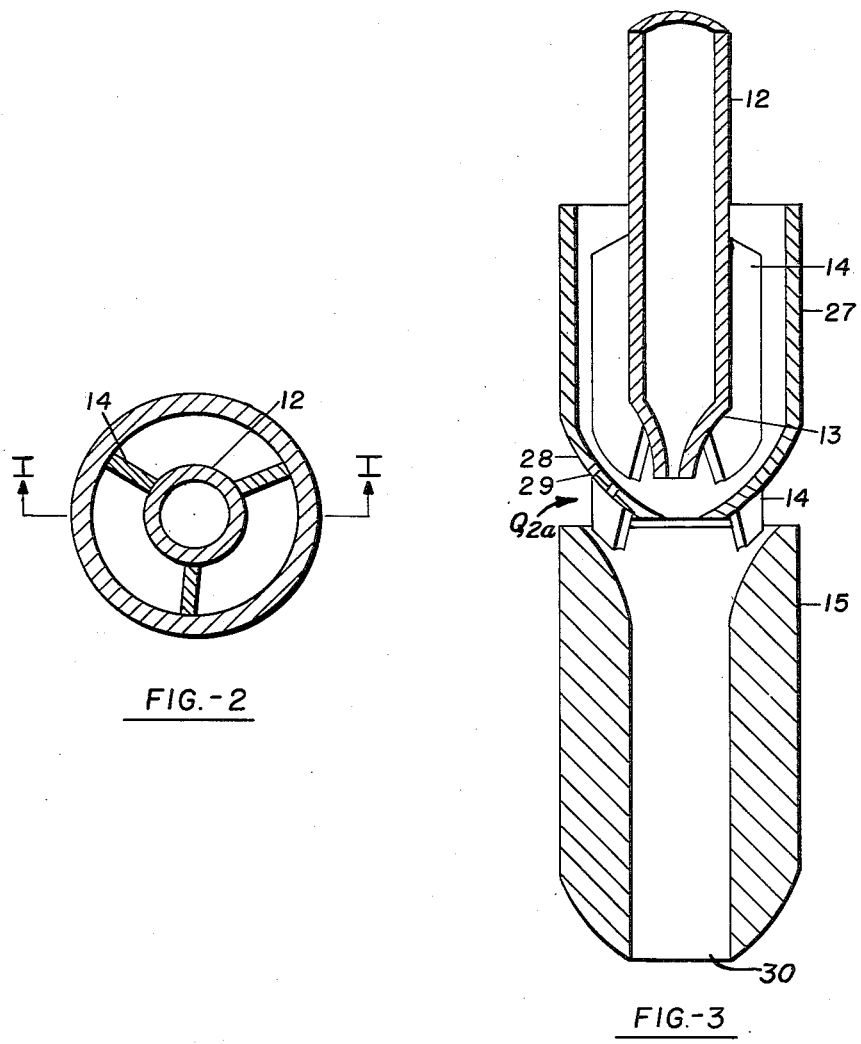

United States Patent Office 2,841,365
Patented July 1, 1958

2,841,365
PELLET RECYCLE CONTROL IN PELLET IMPACT DRILLING

George H. Ramsey, Ardmore, and Fredric H. Deily, Tulsa, Okla., assignors to Esso Research and Engineering Company, a corporation of Delaware Application October 27, 1953, Serial No. 388,551

1 Claim. (Cl. 255—1.8)

This invention relates to a novel form of earth drilling apparatus employing what may be termed pellet impact drilling. The invention is particularly directed to a novel means and method for improving the efficiency of recycling of the pellets in the vicinity of the drilling zone. In accordance with this invention, the paths of the recycled fluid and recycled pellets are separated whereby the pellets may be more efficiently reintroduced into the high velocity fluid stream.

The basic principles of the pellet impact technique for the drilling of bore holes in the earth involves the use of a stream of fluid pumped from the surface of the earth through a tubular member to a jet nozzle adapted to provide a high velocity jet of fluid directed downwardly toward the bottom of the bore hole. Means are provided to entrain in the high velocity fluid jet a multitude of hard, dense pellets which are accelerated to high velocity in the jet stream and thereby acquire considerable kinetic energy so that when the pellets impinge against the formation the resulting impact and fracturing forces exert a drilling action. Means are also provided for separating pellets from the up-flowing returning stream of fluid and reintroducing the pellets into the jet stream. Preferably the pellets that are employed are smooth, non-abrasive, essentially spherical, and of substantial size, in the range of about one-eighth inch to about one inch in diameter. The basic principles of the technique of drilling by pellet impact are set forth in co-pending application Serial No. 268,873, filed by P. S. Williams on January 29, 1952, now abandoned, and entitled "Pellet Impact Method and Apparatus."

One of the limiting factors in the efficiency of drilling by the pellet impact technique is the rate at which pellets can be recycled into the zone where they are entrained in the fluid jet. In the co-pending Williams application referred to, one disclosed method for effecting the recycling of pellets involves the use of a combination of a primary nozzle and a secondary nozzle, or mixing chamber, having a configuration such that the bore hole annulus above the secondary nozzle is enlarged to provide a gravity settling zone where the up-flowing fluid velocity is markedly decreased. This decrease in velocity causes the pellets to separate from the circulating fluid so that they can be drawn into the secondary nozzle by a combination of gravity action and of fluid flow into the secondary nozzle, the latter action being brought about, at least in part, by the aspirating effect resulting from the passage of the fluid jet from the primary nozzle into the secondary nozzle. Experimental studies indicate that other factors, such as a random vortex action of the fluid in the vicinity of the point of entry into the secondary nozzle, also contribute to pellet recycling.

Observations of pellet action with a primary and secondary nozzle arrangement of the type described indicate that the recycled pellets become segregated roughly into two groups in the borehole annulus in the vicinity of the inlet to the secondary nozzle, one group forming a more or less stationary cloud of pellets suspended in the fluid above the secondary nozzle opening and the other group forming a circulating stream of pellets below the stationary cloud referred to. The undulating interface between the two pellet groups can serve as a deflector that directs the circulating group into the secondary nozzle entrance. However, if the interface is a considerable distance above the secondary nozzle entrance the pellet recycling action is inefficient, whereas if the interface is too close to the secondary nozzle entrance the stationary portion of pellets presents a barrier to the circulating pellets. Variations in hole gage, fluid flow rate, and other drilling factors make the control of the position of the interface and resultant efficient pellet recycling quite difficult.

It is one object of the present invention to provide a method and means for improving the efficiency of re-entry of pellets into the secondary nozzle or mixing chamber of a pellet impact bit.

In accordance with the invention a baffle member is utilized for segregating at least a portion of the returning stream of fluid from the upflowing stream of pellets and for directing the segregated stream and the recycled pellets into the secondary nozzle through separate paths.

A fuller understanding of the nature of the invention and of the objects to be accomplished thereby may be obtained by reference to the accompanying drawing, in which:

Figure 2 is a cross section taken on line II—II of Figure 1; and

Figure 3 is a sectional elevation of an alternative embodiment of the invention.

Figure 1:
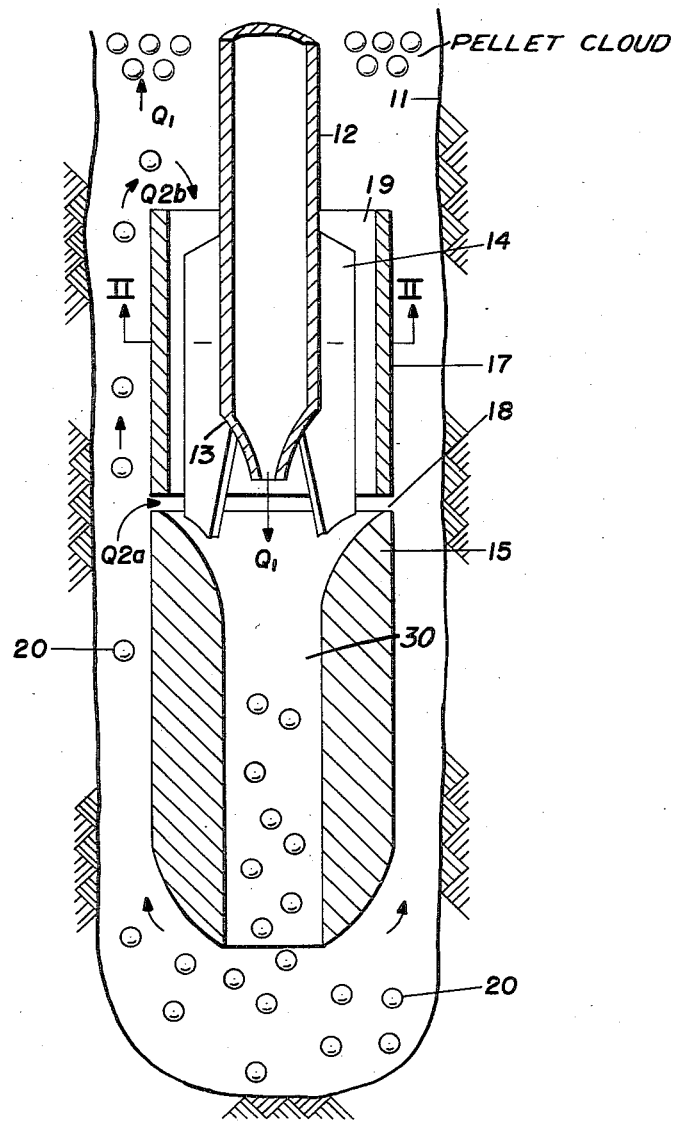
Figure 1 is a sectional elevation of one embodiment of the invention placed in drilling position in a bore hole, the section being taken on line I—I of Figure 2.

Referring now to Figures 1 and 2 in particular, a bore hole 11 is shown in which is positioned a drilling apparatus embodying the present invention. The apparatus is supported in the bore hole on a tubular support 12 which is adapted for attachment to the lower end of a conventional drill pipe. The lower end of tubular support member 12 terminates in a nozzle element 13. Supported below the member 12 and attached thereto by suitable means, such as the three web supporting members 14 illustrated, is a second tubular member 15 having its bore in substantial alignment with the nozzle element 13. The top of the second tubular member defines with the jet nozzle an open annular space which provides fluid access to the top of the second tubular member. Nozzle element 13 may be referred to as a primary nozzle, and member 15 may be referred to as a secondary nozzle and as defining a mixing chamber 30.

A third tubular member or cylindrical sleeve 17, which may also be supported by the web members 14, surrounds the tubular support member 12 and defines therewith an open annular passageway 19 communicating with the opening to the secondary nozzle. The cylindrical element or baffle 17 is so positioned that a gap is retained between its lower termination and the top of the secondary nozzle, thereby providing the annular opening 18.

In utilizing the apparatus illustrated in Figure 1, drilling is conducted much in the same manner as described in the aforementioned copending Williams application, fluid being pumped down the drill pipe through nozzle 13. The fluid leaves this nozzle in the form of a high velocity jet stream, identified as $Q_1$, which enters secondary nozzle 15 where it combines with the aspirated fluid $Q_{2a}+Q_{2b}$ and the total volume, $Q_1+Q_{2a}+Q_{2b}$, passes through the secondary nozzle to impinge on the bottom of the bore hole. The circulating fluid $Q_1+Q_{2a}+Q_{2b}$ returns up the bore hole annulus and carries with it pellets 20 from the bottom of the bore hole. A portion of the up-flowing fluid, $Q_{2a}$, passes through the opening 18 into the secondary nozzle while the remaining fluid and the pellets continue on up the bore hole annulus, the pellets passing the gap 18 because of their higher momentum. Gap 18 is not necessarily smaller than the pellet diameter.

As the pellets reach the enlarged annulus above the top of cylindrical element 17 they lose momentum in the slow moving fluid stream in the enlarged annulus and essentially form a cloud of pellets. The individual pellets then drop down into the annular passage 19 together with aspirated fluid $Q_{2b}$ and from thence into the secondary nozzle, where the pellets again become entrained in the high velocity fluid jet. Here the pellets contain substantially the same velocity as the fluid stream so that, as they leave the lower end of the secondary nozzle, they will strike against the bottom of the bore hole at a high velocity and transfer their kinetic energy to the formation.

The effectiveness of the device illustrated has been shown by test results which demonstrated that a drill of the type described drilled a bore hole in Indiana limestone at a drilling rate, measured in feet per hour, 15% greater than a similar bit in which the cylindrical member 17 was omitted, the drill bit and the drilling conditions otherwise being the same.

An alternative embodiment of the invention is illustrated in Figure 3 wherein the tubular support member and the primary and secondary nozzles are similar to those of Figure 1 and are identified by the same reference numerals. In place of the cylindrical element 17 of Figure 1, however, a modified cylindrical member 27 is provided having a lower portion 28 of lesser diameter that extends slightly into the annular opening adjacent the top of the secondary nozzle. This configuration has the advantage of providing a positive surface for exerting a pressure differential to ensure that the recycled fluid, $Q_{2a}$, will enter the annular opening at the top of the secondary nozzle. If desired, a number of perforations 29 may be supplied in the conical surface 28 to compensate for slight shifts in fluid flow pattern.

The scope of the invention is defined by the following claim and is not to be limited merely to the specific embodiments hereinbefore described by way of example, as many obvious modifications thereof can be made without departing from the invention.

What is claimed is:

A method of drilling a bore hole in the earth which comprises creating a constricted high velocity jet of fluid, directing said fluid jet into a mixing chamber, introducing into and entraining in said fluid jet a plurality of pellets in said mixing chamber, directing the mixture of fluid and pellets forcibly against the formation to be drilled and centrally of the bore hole, circulating the mixture of fluid and pellets, after impact, upwardly in an annular channel flow adjacent the walls of the bore hole, separating and diverting a first portion of the fluid from the up-flowing mixture of fluid and pellets into the top of said mixing chamber, directing the pellets and remaining up-flowing fluid upwardly in said annular channel to a region above said mixing chamber, separating said pellets and a second portion of said fluid from the remaining up-flowing fluid in said region and conducting said pellets and said second fluid portion substantially separately from said first portion into said mixing chamber through an annular channel flow concentric with said first annular channel, whereby improved efficiency of pellet recycle into said mixing chamber is attained.

References Cited in the file of this patent

UNITED STATES PATENTS

| 2,072,627 | Zublin | Mar. 2, 1937 |
| 2,233,260 | Hawthorne | Feb. 25, 1941 |
| 2,706,104 | Ortloff et al. | Apr. 12, 1955 |